United States Patent
Shatsky et al.

(10) Patent No.: US 11,074,130 B2
(45) Date of Patent: Jul. 27, 2021

(54) REDUCING REBUILD TIME IN A COMPUTING STORAGE ENVIRONMENT

(71) Applicant: INTERNATIONAL BUSINESS MACHINES CORPORATION, Armonk, NY (US)

(72) Inventors: Yosef Shatsky, Karnei Shomron (IL); Asaf Porat-Stoler, Ramat Gan (IL); Ofer Leneman, Tel Aviv (IL); Sergey Marenkov, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 16/367,245

(22) Filed: Mar. 28, 2019

(65) Prior Publication Data
US 2020/0310914 A1 Oct. 1, 2020

(51) Int. Cl.
*G06F 11/00* (2006.01)
*G06F 11/10* (2006.01)
*G06F 3/06* (2006.01)

(52) U.S. Cl.
CPC ........ *G06F 11/1092* (2013.01); *G06F 3/0619* (2013.01); *G06F 3/0644* (2013.01); *G06F 3/0689* (2013.01)

(58) Field of Classification Search
CPC .............. G06F 11/0706; G06F 11/108; G06F 11/1088; G06F 11/1092; G06F 11/1096; G06F 2211/1009; G06F 11/1084; G06F 11/2053; G06F 11/2056; G06F 11/2058
USPC .............................................. 714/6.24, 1–57
See application file for complete search history.

(56) References Cited

U.S. PATENT DOCUMENTS

| | | | |
|---|---|---|---|
| 9,594,652 B1 | 3/2017 | Sathiamoorthy et al. | |
| 2004/0250017 A1 | 12/2004 | Patterson et al. | |
| 2006/0236029 A1 | 10/2006 | Corrado | |
| 2006/0288161 A1* | 12/2006 | Cavallo | G06F 11/1076 711/114 |
| 2010/0037022 A1* | 2/2010 | Chou | G06F 11/1076 711/114 |
| 2014/0215147 A1 | 7/2014 | Pan | |
| 2015/0205667 A1* | 7/2015 | Bonwick | G06F 11/1076 714/6.24 |
| 2015/0286531 A1* | 10/2015 | Bondurant | G06F 11/1088 714/6.23 |

(Continued)

FOREIGN PATENT DOCUMENTS

| | | |
|---|---|---|
| CN | 105531677 A | 7/2016 |
| CN | 107391027 A | 5/2019 |
| WO | 2015108670 A1 | 7/2015 |

OTHER PUBLICATIONS

Leventhal, "Triple-Parity Raid and Beyond", Sun Microsystems, Dec. 17, 2009 (Year: 2009).*

(Continued)

*Primary Examiner* — Sarai E Butler
(74) *Attorney, Agent, or Firm* — Griffiths & Seaton PLLC

(57) ABSTRACT

Embodiments for reducing rebuild time in a computing storage environment in by a processor. One or more disk drive failures in a Redundant Array of Independent Disks (RAID)-6 may be rebuilt by holding at least three parity strips per stripe while using one or more of the at least three parity strips according the one or more disk drive failures.

20 Claims, 9 Drawing Sheets

(56) References Cited

U.S. PATENT DOCUMENTS

| | | | |
|---|---|---|---|
| 2015/0378629 A1* | 12/2015 | Suzuki | G06F 3/0644 |
| | | | 711/154 |
| 2016/0085647 A1* | 3/2016 | Ramasubramaniam | |
| | | | G06F 11/2033 |
| | | | 714/4.12 |
| 2016/0246678 A1* | 8/2016 | Galbraith | G06F 3/0688 |
| 2017/0161146 A1 | 6/2017 | Han et al. | |
| 2018/0032433 A1* | 2/2018 | Ito | G06F 3/0689 |
| 2019/0020378 A1* | 1/2019 | Pieber | H04B 5/0062 |
| 2019/0121698 A1* | 4/2019 | Xu | G06F 11/1088 |
| 2019/0220376 A1* | 7/2019 | Wang | G06F 11/1076 |
| 2020/0042387 A1* | 2/2020 | Shani | G06F 3/067 |
| 2020/0133778 A1* | 4/2020 | Liu | G06F 3/0653 |
| 2020/0249869 A1* | 8/2020 | Glimcher | H03M 7/30 |

OTHER PUBLICATIONS

Wang et al., "MDR Codes: A New Class of RAID-6 Codes with Optimal Rebuilding and Encoding", https://arxiv.org, 2018. (30 Pages).

\* cited by examiner

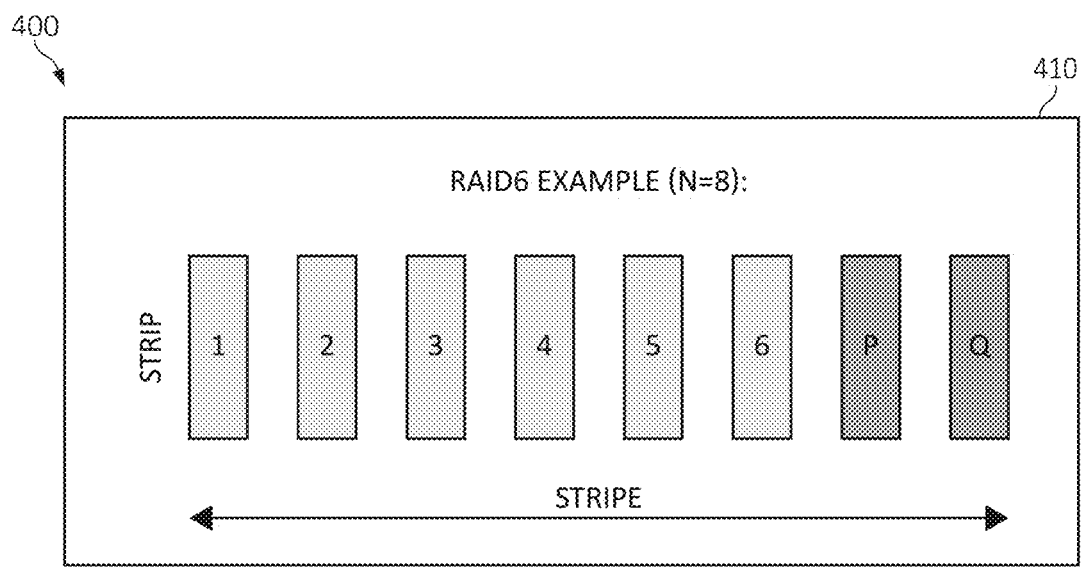
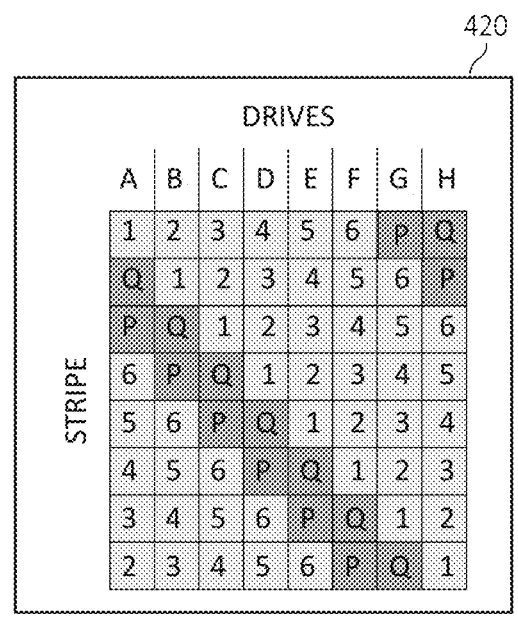
FIG. 4

| DRIVE FAILURES | CORRUPTED STRIPS | REBUILD |
|---|---|---|
| 1 | D1 | RAID5 REBUILD OF P-STRIPE1 |
| 2 | P1 | RAID5 REBUILD OF P-STRIPE1 |
| | Q | RAID6 REBUILD OF STRIPE |
| | DP1 AND Q | RAID5 REBUILD OF P OR D'S P-STRIPE1<br>RAID6 REBUILD OF STRIPE FOR Q |
| | DP1 ("DP1" DATA IN PARITY) AND DP2 | RAID5 REBUILD OF BOTH P-STRIPES |
| | P1 AND D1 | RAID6 REBUILD OF D1 FROM OTHER DS IN STRIPE AND Q<br>REBUILD P1 FROM DS IN P-STRIPE |
| | 2*D1 (2 DRIVE FAILURE) | CALCULATE P = P1 ⊕ P2<br>RAID6 REBUILD OF STRIPE USING P, Q AND OTHER DS |
| 3 | 3*D1 (3 DRIVE FAILURES) | P-STRIPE1 IS LOST |
| | (3*DP1) OR (Q AND 2*PD1) | P-STRIPE1 IS LOST<br>RECALCULATE Q BASED ON D2 (POSSIBLY REWRITE P1) |
| | 2*DP1 AND DP2 | RAID5 REBUILD OF P-STRIPE2<br>RAID6 REBUILD OF P-STRIPE1 |
| | Q AND DP1 (ANYWHERE IN P STRIPE 1) AND DP2 (ANYWHERE IN P STRIPE 2) | RAID5 REBUILD OF P-STRIPE1<br>RAID5 REBUILD OF P-STRIPE2<br>RAID6 REBUILD OF STRIPE FOR Q |

FIG. 6

REBUILD TIME OF RAID6P/RAID6:

| CONFIGURATION | DOUBLE FAILURE | SINGLE FAILURE |
|---|---|---|
| 128 DRIVES, 8+2 VS 12+3 | 83% (17%) | 80% (20%) |
| 128 DRIVES, 24+2 VS 36+3 | 85% | 77% |
| 64 DRIVES, 16+2 VS 24+3 | 90% | 78% |
| 48 DRIVES, 16+2 VS 24+3 | 95% | 78% |
| 24 DRIVES, 8+2 VS 12+3 | 100% | 80% |
| 24 DRIVES, 12+2 VS 18+3 | 110% (WORSE THAN RAID6) | 79% |

FIG. 7

REDUCING REBUILD TIME IN A COMPUTING STORAGE ENVIRONMENT

BACKGROUND OF THE INVENTION

Field of the Invention

The present invention relates in general to computing systems, and more particularly to, various embodiments for reducing rebuild time in a computing storage environment using a computing processor.

Description of the Related Art

Computing systems may be found in the workplace, at home, or at school. Computer systems may include data storage systems, or disk storage systems, to process and store data. A storage system may include one or more disk drives, which may be configured in an array, such as a Redundant Array of Independent Disks (RAID) topology. In a RAID system, data is stored redundantly across multiple disks in a variety of configurations to provide data security in the event of a hardware or software failure.

As the technology field grows exponentially each year and ever-growing amounts of critical data are stored on storage systems such as RAIDs, the need to rebuild failed disk drives becomes increasingly paramount. Consequently, the need for advancement in the data storage field is of great precedence.

SUMMARY OF THE INVENTION

Various embodiments for reducing rebuild time in a computing storage environment by a processor, are provided. In one embodiment, by way of example only, a method for faster rebuild time in a RAID 6 computing storage environment, again by a processor, is provided. One or more disk drive failures in a Redundant Array of Independent Disks (RAID)-6 may be rebuilt by holding at least three parity strips per stripe and using one or more of the three parity strips according the one or more disk drive failures.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a block diagram depicting a stripe in Redundant Array of Independent Disks (RAID) 6 topology in accordance with aspects of the present invention;

FIG. 6 is a table diagram listing disk failure combinations and rebuilds for the various disk failure combinations using an enhanced Redundant Array of Independent Disks (RAID) 6 in accordance with aspects of the present invention;

FIG. 7 is a table diagram listing a table listing disk failure combinations and rebuilds for the various disk failure combinations using an enhanced Redundant Array of Independent Disks (RAID) 6 in accordance with aspects of the present invention;

DETAILED DESCRIPTION OF THE DRAWINGS

Figure 1:
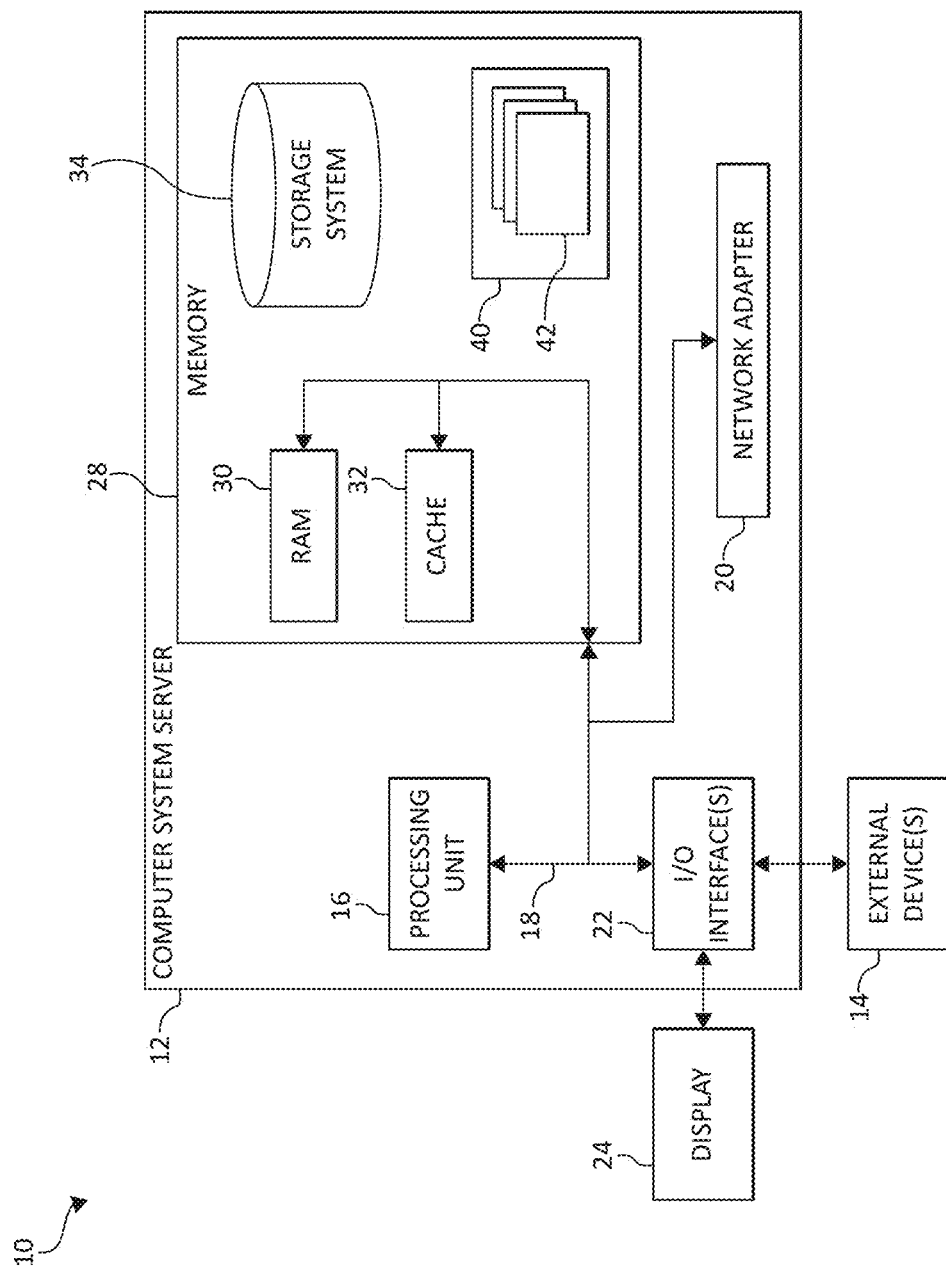
FIG. 1 is a block diagram depicting an exemplary cloud computing node according to an embodiment of the present invention.

A Redundant Array of Independent Disks ("RAID") is an array, or group, of hard disk drives controlled by a single array controller and combined to achieve higher transfer rates than a single, large drive. Even though multiple drives are controlled by one adapter, the RAID device appears as one drive to the data processing system. Depending on the configuration, the RAID device will increase the level of protection and storage capacity for a data processing system over a single, hard disk drive. The primary functions of the RAID system are to increase the availability, protection and storage capacity of data for a data processing system.

RAID technology generally distributes data across the drives according to the format of the particular RAID classification (RAID 1, 2, 3, 4, 5 or 6). Copies or portions of data for a particular file may be written in segments on more than one disk drive, a process referred to as "striping." By storing the data and instructions on multiple drives, higher data transfer rates are enhanced by the ability of the controller to schedule read and write commands to multiple drives in parallel.

When one disk of the RAID fails, data from that failed disk must be regenerated, e.g., rebuilt using error correction information from the remaining disks in the group. That is, when a disk-drive component of a RAID fails, the RAID may be rebuilt to restore data redundancy. This may be accomplished by replacing the failed disk-drive component with a standby disk-drive component and copying and/or regenerating the lost data on the standby disk-drive component. Ideally, the RAID will be rebuilt as expeditiously as possible to minimize the possibility that another disk-drive component will fail and result in permanent data loss.

When a RAID is being rebuilt due to a disk failure, the read/write response time are negatively impacted due to the competition for resources. If more resources are dedicated to rebuilding the RAID, the I/O performance suffers. If more resources are dedicated to servicing I/O requests, the rebuild time is extended. The longer rebuild time increases the probability that a failure will occur that results in permanent data loss. Accordingly, reducing rebuild time (e.g., faster rebuild time) in a computing storage environment, particularly in a RAID 6 topology is critically important to improving computing efficiency.

In one embodiment, by way of example only, a method for faster rebuild time in a Redundant Array of Independent Disks (RAID)-6 computing storage environment, again by a processor, is provided one or more disk drive failures in a RAID-6 may be rebuilt by assigning a first parity strip to a first section of a stripe and a second parity strip to a second section of the stripe and a third parity strip to the entire stripe and rebuilding the first section or the second section according to a defined order based on a location of one or more failed disk/strips. The first parity strip is a P parity strip, the second parity strip is a P parity strip, and the third parity strip is a Q parity strip.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
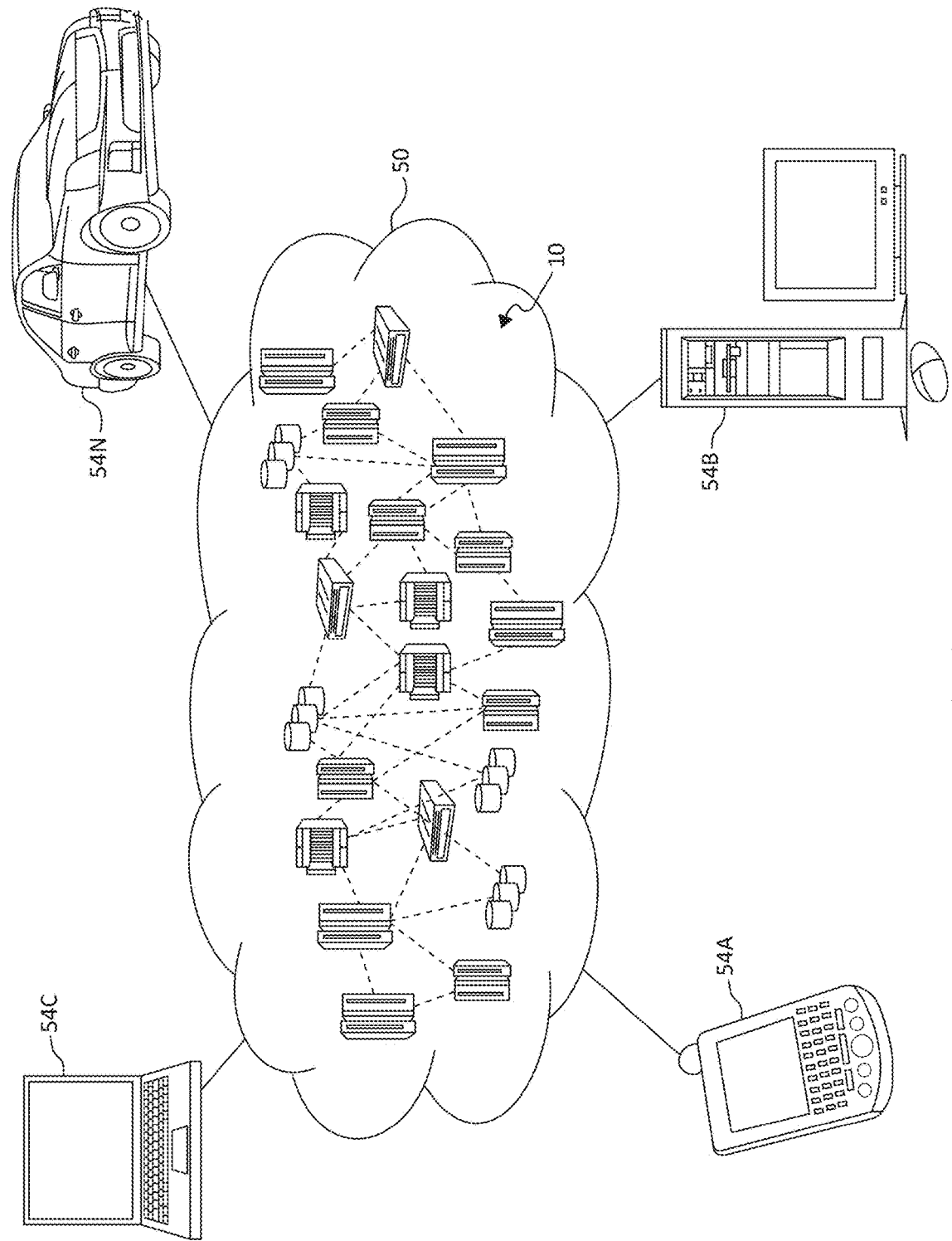
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
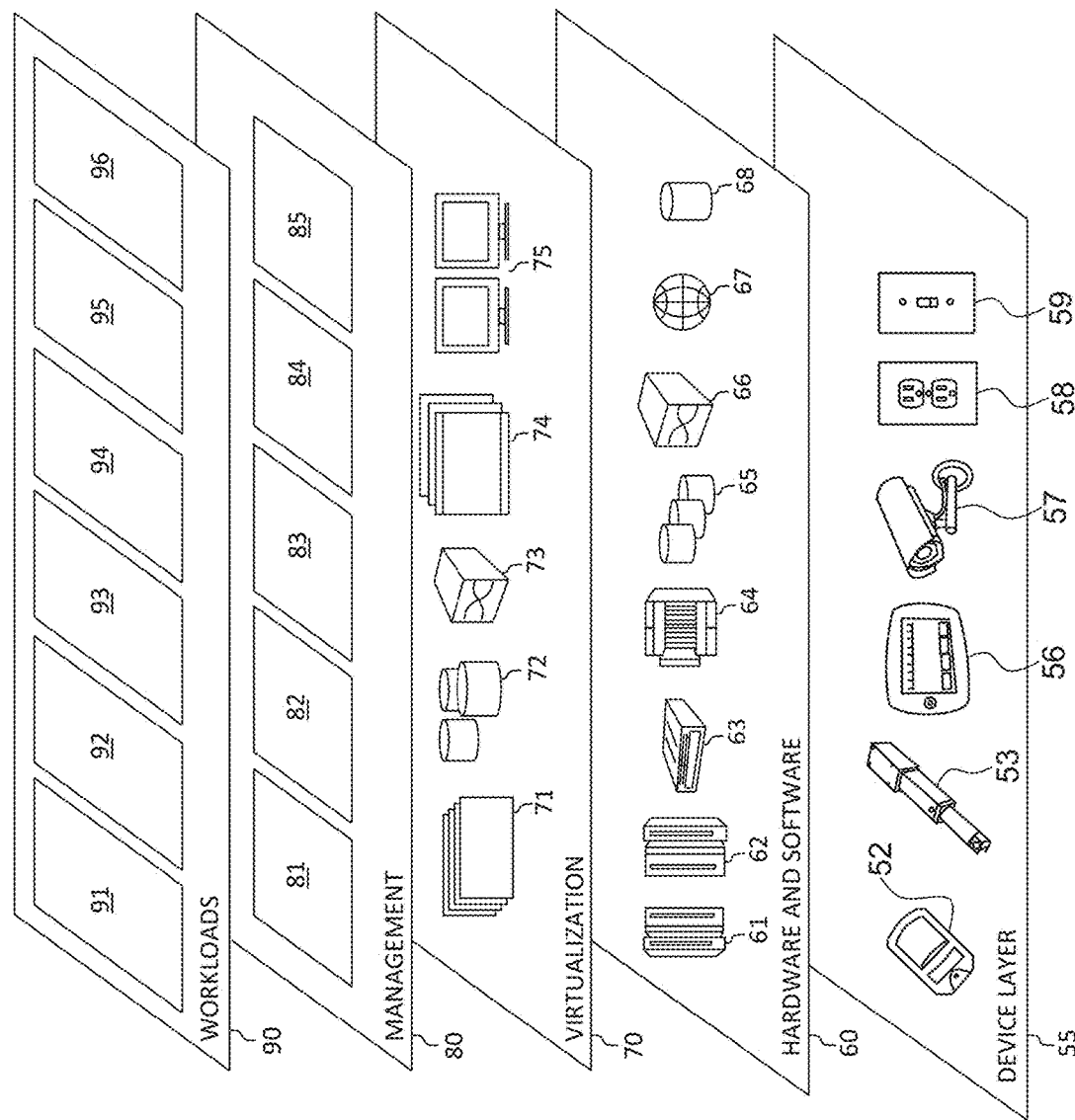
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for reducing rebuild time in a RAID 6 computing storage environment such as, for example, in the hardware and software layer 60. In addition, reducing rebuild time in a RAID 6 computing storage environment such as, for example, in the hardware and software layer 60 may include such operations as performance workload analytics, performance profile analysis, rebuilding one or more disk drives, and other computing storage related functions. One of ordinary skill in the art will appreciate that the workloads and functions 96 for reducing rebuild time in a RAID 6 computing storage environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

It should be noted that in a RAID 5 topology, RAID 5 reads and writes data segments across multiple data drives and writes parity to the same data disks. The parity data ("P") is never stored on the same drive as the data it protects, allowing for concurrent read and write operations. Within any stripe of a five drive RAID 5 configuration, all drives contain data information and parity information. If one of the data drives were to fail, the remaining four data drives and the parity on each remaining may be used to regenerate user data which improves improving data protection.

Alternatively, RAID 6 improves the data protection of RAID 5 by providing two parity strips (e.g., P parity strip and Q parity strip), as illustrated in FIG. 4. That is, FIG. 4 depicts a RAID 6 topology (with N drives) showing a RAID 6 having 8 strips (e.g., strip 1-6 and P parity strip and Q parity strip) in a single stripe 410. In one aspect, one or more of the components, modules, services, applications, and/or functions described in FIGS. 1-3 may be used in FIG. 4. Also, many of the functional blocks may also be considered "modules" of functionality, in the same descriptive sense as has been previously described in FIGS. 1-3. Repetitive description of like elements, components, modules, services, applications, and/or functions employed in other embodiments described herein is omitted for sake of brevity.

As illustrated in block 420, one or more stripes may be included in one or more disk drives ("drives") such as, for example, drives A-H. That is, both RAID 5 and RAID 6 use striping which means that the data is written cyclically over the drives such as, for example, drives A-H, and the role of each drive is rotated so that strips 1-6, P and Q are spread over all the drives, as depicted in block 420 depicting a RAID 6 topology.

In one aspect, the RAID 6 topology is a scheme of disk redundancy used to obtain high reliability of a disk array. In a configuration of N drives, RAID 6 utilizes 2 drives for parity checking: P parity strip (or "P parity drive") and Q parity strip (or "Q parity drive"). P parity may be calculated using an XOR operation and Q may be calculated using parity and Reed-Solomon codes. Moreover, in one aspect, for data protection in RAID 6, RAID 6 includes 2 parity strips and always protects against 2 failures. P parity and Q parity protect the same strips/drives. Each stripe has a P parity and a Q parity. A RAID 6 device with this configuration, by way of example only, may be depicted as having multiple rows and multiple columns of data drives with each row and column ending with a parity drive. Such approaches differ from a RAID 5 that use only a single parity strip.

Thus, the advantage of RAID 6 over RAID 5 is the ability to survive two disk failures. In this way, a RAID 6 configuration increases the percentage, storage efficiency, and availability of data (e.g., a 99.999% minimum storage system requirement) for a computing storage system as compared to RAID 5. However, the disadvantage of RAID 6 is the increased write overhead and increased capacity overhead.

In one aspect, in selecting a RAID 6 configuration (strip and stripe sizes), one or more of the following factors should be considered. 1) The capacity overhead (the P and Q). For example, in RAID 6 there is more capacity efficient when there are more strips ("N" arbitrary number). This also has a direct influence on the drives' endurance. 2) The RAID rebuild time. For example, the more strips there are the more data must be read to rebuild a failed drive. 3) The number of physical drives. For example, the number of strips cannot be greater than the number of physical drives. 4) A computer storage system's required reliability. For example, in RAID 6 there is no data loss until there are three simultaneous drive failures. The reliability is a factor of the drive's failure rate and the rebuild time. The rebuild time is longer when the drive's capacity is larger and when N is larger (because there is more data to read). The probability of data loss is the probability of a first drive failing, times the probability of two more drives failing during the rebuild time of the first. The failure rate of a drive is typically measured using two metrics. The first metric is the mean time between failures ("MTBF") (e.g., failure is per drive). The second metric is the uncorrectable bit error rate ("UBER") (e.g., a failure is per bit). Thus, there is a built-in tradeoff between capacity overhead and reliability. Additionally, the rebuild time is a critical factor in the reliability of the storage system. The longer a rebuild takes, the more a computer system is susceptible to data loss.

Accordingly, the present invention provides for an enhanced modification to RAID 6 that reduces the rebuild time of a single drive failure, as well as the rebuild time of a double drive failure in many cases/instances. The double drive rebuild time is gained at the expense of extending the time it takes to fix only the stripes with two failed strips per stripe. That is, the present invention may hold three parity strips per stripe, but unlike triple parity RAID, the present invention user two parity strips ("Ps") such as, for example, P1 and P2 where P1 is the parity of the first half of the strips and P2 is the parity of the second half of the strip. Q may remain as it is defined in RAID 6. In this way the modification is an enhanced RAID 6, where the "enhanced" language indicates an extra P used compared RAID 6.

Figure 5:
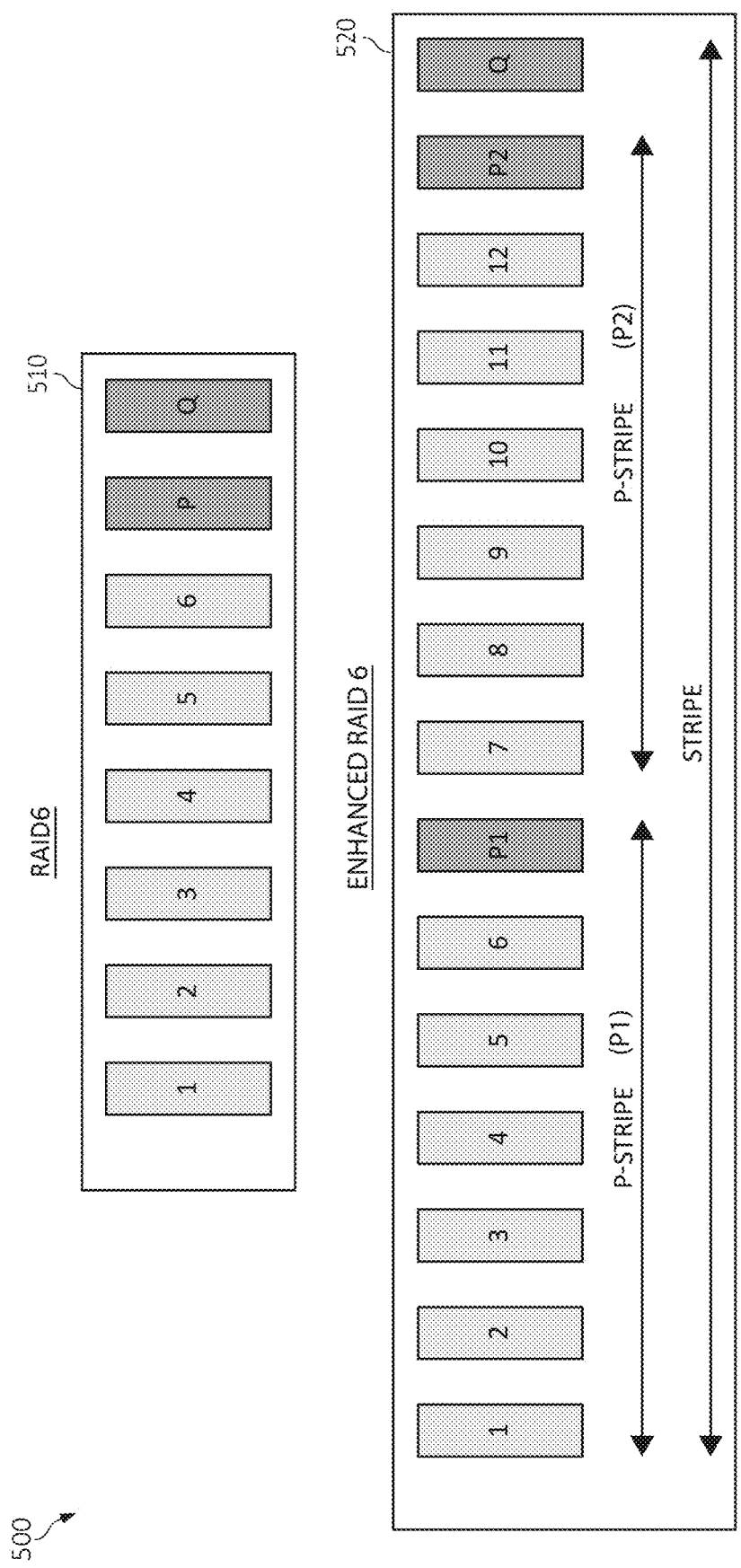
FIG. 5 is a block diagram depicting comparing a Redundant Array of Independent Disks (RAID) 6 topology to an enhanced Redundant Array of Independent Disks (RAID) 6 in accordance with aspects of the present invention.

Turning now to FIG. 5, diagram 500 depicts a comparison of a RAID 6 topology 510 to an enhanced RAID 6 (e.g., modified RAID 6 or "RAID 6P) 520. As shown, descriptive information is seen relating each of the functional blocks 500. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for sake of brevity.

In one aspect, the present invention provides enhanced RAID 6 (520) by holding three parity strips per stripe. In contrast to triple parity RAID, the present invention provides for only using two parities ("Ps"). In one aspect, a first parity (e.g., "P1," p-stripe 1 or parity strip 1) may be the parity of a first half of strips in a stripe. A second parity (e.g., "P2," p-stripe 2 or parity strip 2) may be the parity of a second half of the strips in a stripe. The Q is Reed Solomon over all data strips as defined in RAID 6. Thus, the enhanced RAID 6 such as, for example, enhanced RAID 6 (520), the added p indicates the extra P used compared RAID 6. Thus, the cost of the enhanced RAID 6 such as, for example, enhanced RAID 6 (520) may be assumed to be a factor of the number of reads required to rebuild a drive.

More specifically in FIG. 5, the upper row is a traditional RAID 6 such as, for example, RAID 6 (510) where N is 10 and the overhead is equal to 20 percent (%) (e.g., 2/10). The lower row is the enhanced RAID 6 such as, for example, enhanced RAID 6 (520) where N equals 15 with the same overhead of 20% (e.g., 3/15). For illustration and comparison, the present invention is depicted by intentionally selecting an example for comparison with equivalent overhead, to compare the rebuild time of the enhanced RAID 6 (520) to that of a non-enhanced RAID 6 (510). The term "p-stripe" is used to indicate a selected portion of the stripe covered by a single parity ("P") drive such as, for example, P1 covering a first section or first p-stripe in a stripe and/or P2 covering a second section or second p-stripe in the stripe. A p-stripe contains (N−1)/2 strips, out of which one is P and (N−1)/2−1 are data.

It should be noted that the core structure of the RAID 6 (510) is preserved in the enhanced RAID 6 (520) since P equals P1 XOR function P2 (e.g., P=P1⊕P2), which can be used to carry out any RAID 6 rebuild. Thus, the advantages of the enhanced RAID 6 (520) may include each of the following. 1) A single failure in any strip (except Q) is faster to rebuild because only one p-stripe must be rebuilt. 2) The chance of a double failure is reduced because two failures in the same stripe, but separate p-stripes, are now just a single failure in the enhanced RAID 6 (520). A double failure occurs only when there are two failures in the same p-stripe or there is one error in a p-stripe and an error in Q. 3) The amount of data lost in the event of three drive failures is lower than the non-enhanced RAID 6 (510) because data is only lost when the strips from the same p-stripe are lost, or 2 strips from the same p-stripe and Q.

Using the above example (e.g., N equals 8+2 compared to N equals 12+3), the rebuild time of a single failure in the enhanced RAID 6 (520) is only 80% of the rebuild time of the non-enhanced RAID 6 (510). It should be noted that even though the examples all discuss the case of 2 p-stripes per stripe, the present invention may apply to any number of p-stripes per stripe. Thus, as illustrated herein, each p-stripe in the enhanced RAID 6 (520) is turned into a RAID 5 configuration. For example, the enhanced RAID 6 (520) has a RAID 5 configuration due to P1 covering a first section or first p-stripe in a stripe and a second RAID 5 configuration due to P2 covering the second section or the second p-stripe in the stripe, which is further illustrated in the rebuild table 600.

Turning now to FIG. 6, table 600 depicts lists disk failure combinations and rebuilds for the various disk failure combinations using an enhanced RAID 6 such as, for example, the enhanced RAID 6 (520) of FIG. 5. In one aspect, one or more of the components, modules, services, applications, and/or functions described in FIGS. 1-5 may be used in FIG. 6. Repetitive description of like elements, components, modules, services, applications, and/or functions employed in other embodiments described herein is omitted for sake of brevity.

Specifically, table 600 illustrates a drive failure, corrupted strips, and a rebuild order for the particular failed drive. For example, table 600 illustrates a rebuild operation of the enhanced RAID 6 (520) topology. Table 600 depicts every combination of possible drive failures being rebuilt according to a defined order. To further illustrate, the following definitions are used in Table 600. "D{i}" represents a data strip from p-stripe i∈{1,2}. Q is the Q parity strip. "DP{i}" is a data or P parity strip from p-stripe i∈{1,2}. "P{i}" is a parity of p-stripe i∈{1,2}. "P" is a parity of a stripe that is equal to the XOR of P1 and P2 (e.g., P is not stored). Thus, table 600 lists all the possible failure combinations and specifies the rebuild type for that particular drive failure. It should be noted that in the table 600, any case that refers only p-strip 1 (e.g., D1 and P1) is equally relevant to p-strip 2.

For example, for a single drive failure, if the corrupted strip is D1, the rebuild is to rebuild p-strip 1 of RAID 5. Alternatively, if the corrected strip is P1, the rebuild is to rebuild p-strip 1 of RAID 5.

For two drive failures, if the corrupted strips are DP1 and Q, the rebuild is to rebuild P or D's p-strip 1 of RAID 5 and rebuild the stripe for Q in the RAID 6. If the corrupted strips are DP1 (e.g., "DP1" data in parity) and DP2, both p-stripes of RAID 5 are rebuilt. If the corrupted strips are P1 and D1, the rebuild is to rebuild D1 from other D's in the stripe and Q and also rebuild P1 from the D's in the particular P-strip. Alternatively, if there are two corrupted strips (e.g., 2 multiplied by D1), P is calculated by XORing P1 and P2 (e.g., P1 XOR P2), and the strip is rebuilt using RAID 6 using P, Q, and D's.

For three drive failures, if there are multiple corrupted strips (e.g., 3 multiplied by D1), P-strip 1 is lost. If there are multiple corrupted strips (e.g., 3 multiplied by D1) or Q and two corrupted strips (e.g., 2 multiplied by D1), P-strip 1 is lost or Q may be recalculated based on D2 and potentially re-write P1 for the rebuild. If there are multiple corrupted strips (e.g., 2 multiplied by DP1 and DP2, p-strip 2 of RAID 5 is rebuilt and p-stripe 1 of RAID 6 is rebuilt. If the corrupted files are Q and DP1 (e.g., anywhere in p-stripe 1) and DP2 (e.g., anywhere in p-stripe 2), the p-stripe 1 of RAID 5 is rebuilt, the p-stripe 2 of RAID 5 is rebuilt, and the Q stripe for RAID 2 is rebuilt.

Rebuild Order (Optimal Order of Rebuild)

Thus, due to the striping in a RAID, when a drives fail there will be a combination of the scenarios in Table 600. Table 600 illustrates the rebuild times of different RAID configurations. For example, in the non-enhanced RAID 6 (510), the rebuild operation is to first rebuild stripes with two failures and then repair the stripes with only one failure. However, as illustrated in table 600, the enhanced RAID 6 520 topology depicts there are more combinations. Accordingly, the preferred/optimal order for enhanced RAID 6 rebuild is as follows. For 3 drive failures, Q and one DP in each p-stripe are rebuilt. For 2 drive failures, 1) Q and one DP are rebuilt (handle the case of loss of q and one DP), and/or 2) DPs from the same p-stripe are rebuilt. For one drive failure, Q is rebuilt and/or a DP is rebuilt. That is, the rebuild times of different RAID configurations may be as follows. 1) 3 failures—a) Q and one DP in each p-stripe, and/or b) 2 DPs in one p-stripe and one in the other. 2) 2 failures—a) Q and one DP, and/or b) 2 DPs from the same p-stripe. 1) 1 failure—a) Q and/or b) DP. It should be noted that the "a)" and the "b)" options are different cases or "states" of a stripe. There may be stripes in all of the above states.

Rebuild Time

It should be noted that in relation to the rebuild time, the comparison between the non-enhanced RAID 6 (510) and the enhanced RAID 6 (520) depends on the size of the RAID stripe. As before, the comparison between the non-enhanced RAID 6 (510) and the enhanced RAID 6 (520) is performed such that the RAID overhead is equal (e.g., N equals 8+2 for non-enhanced RAID 6 (510) compared to N equals 12+3 for the enhanced RAID 6 (520)).

Accordingly, for a single failure, the enhanced RAID 6 (520) will rebuild only one p-stripe. This leads to 20% shorter rebuild time compared to non-enhanced RAID 6 (510) using example above. For a double failure, there is a tradeoff. The enhanced RAID 6 (520) has a shorter total rebuild time when there are many drives, but a longer time when there are fewer drives. This is due to the reduced chance of the two failures residing in the same p-stripe. Additionally, another tradeoff is that the time to rebuild only the stripes with two failures is longer in the enhanced RAID 6 (520). Thus, table 700 of FIG. 7 provides exemplary sample rebuild times for different configuration of the enhanced RAID 6 (520) (where to N equals 12+3) compared to the non-enhanced RAID 6 (510) (where N equals 8+2).

Amount of Data Lost on Triple Failure

In one aspect, the enhanced RAID 6 (520) loses less data than RAID 6 (510) when there is a triple failure because of two reasons. First, unlike the RAID 6 (510), the enhanced RAID 6 (520) stripes do not always lose data when there are three failures. Second, when there is a triple failure, only one p-stripe is lost in the enhanced RAID 6 (520).

Performance

It should be noted that the performance between the enhanced RAID 6 (520) (where to N equals 12+3) compared to the non-enhanced RAID 6 (510) (where N equals 8+2) is the same. In one aspect, sequential writes have the same throughput (for configurations of equal overhead). Also, the Input/output operations per second ("IOPS") is equal because a random write still requires reading and writing both P and Q.

Figure 8:
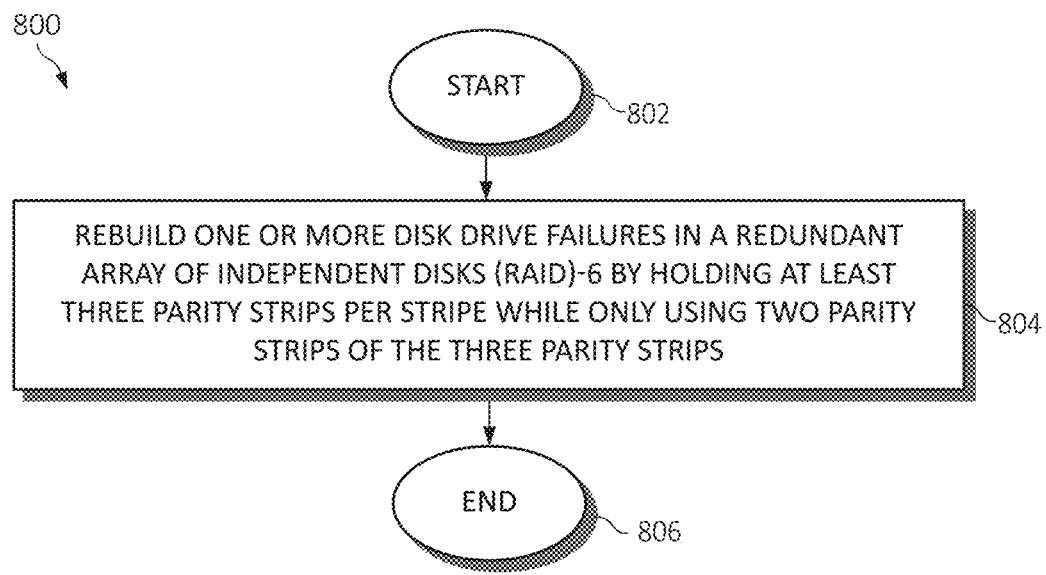
FIG. 8 is an additional flowchart diagram depicting an exemplary method for reducing rebuild time in a computing storage environment by a processor in which aspects of the present invention may be realized.

Turning now to FIG. 8 is an additional flowchart diagram 800 depicting an exemplary method for reducing rebuild time in a computing environment, again in which various aspects of the present invention may be realized. In one aspect, one or more of the components, modules, services, applications, and/or functions described in FIGS. 1-7 may be used in FIG. 8. The functionality 800 may be implemented as a method executed as instructions on a machine, where the instructions are included on at least one computer readable medium or one non-transitory machine-readable storage medium. The functionality 800 may start in block 802.

One or more disk drive failures in a Redundant Array of Independent Disks (RAID)-6 may be rebuilt by holding and using at least three parity strips per stripe while only using two parity strips of the three parity strips, as in block 804. That is, all 3 parity strips are used but in different cases according to the location of one or more corrupted strips. Also, if there are failures in corrupted strips DP1, DP2 and Q, all three parity strips will be used. The functionality 800 may end, as in block 806.

Figure 9:
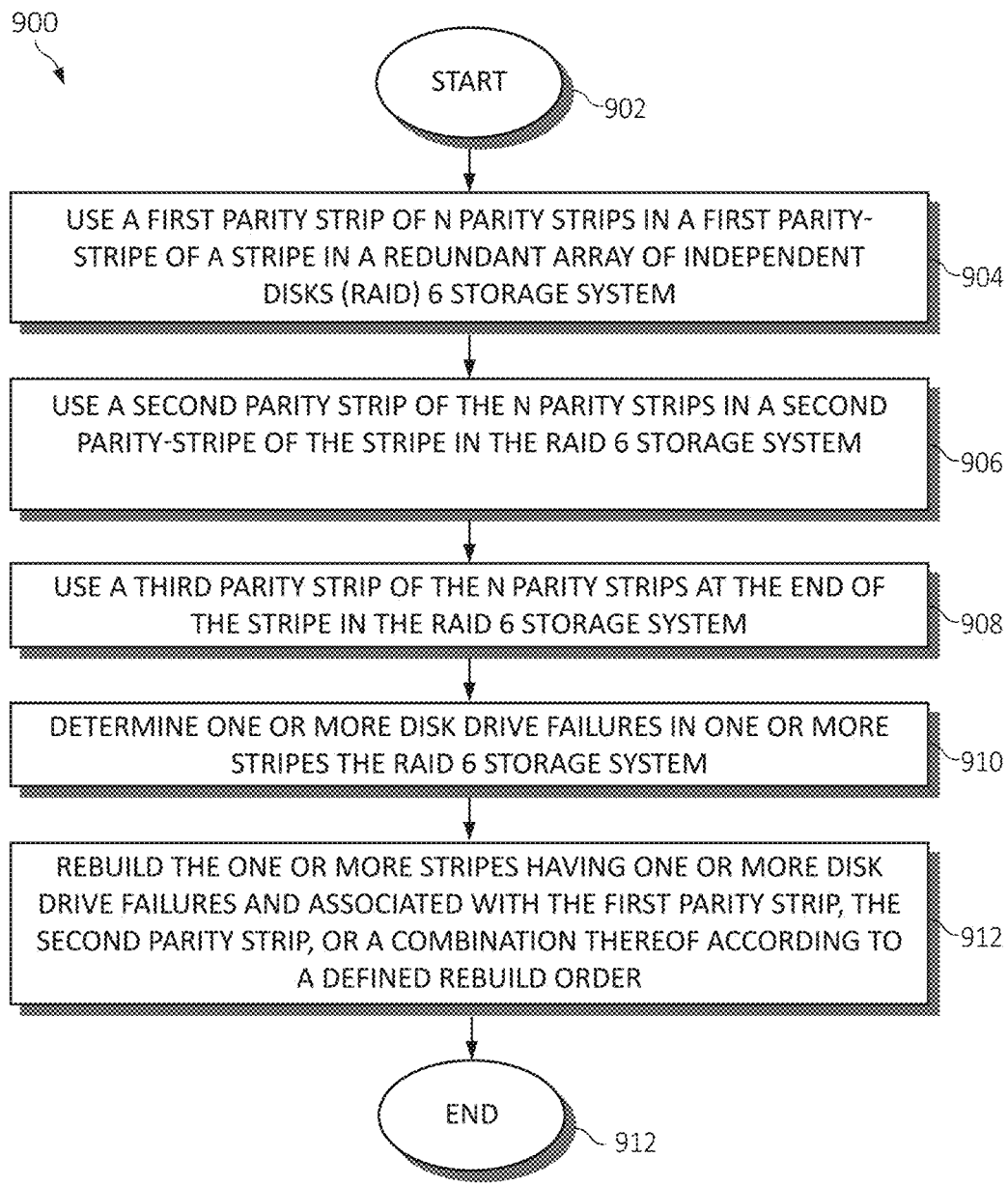
FIG. 9 is an additional flowchart diagram depicting an exemplary method for reducing rebuild time in a computing storage environment by a processor, again in which aspects of the present invention may be realized.

Turning now to FIG. 9 is an additional flowchart diagram 900 depicting an exemplary method for reducing rebuild time in a computing environment, again in which various aspects of the present invention may be realized. In one aspect, one or more of the components, modules, services, applications, and/or functions described in FIGS. 1-7 may be used in FIG. 9. The functionality 900 may be implemented as a method executed as instructions on a machine, where the instructions are included on at least one computer readable medium or one non-transitory machine-readable storage medium. The functionality 900 may start in block 902.

A first parity strip of N parity strips (where N may be a positive integer or a defined value) may be used/held in a first parity-stripe of a stripe in a RAID 6 storage system, as in block 904. A second parity strip of the N parity strips may be used/held in a second parity-stripe of the stripe in the RAM 6 storage system, as in block 906. A third parity strip of the N parity strips may be used/held at the end of the stripe in the RAID 6 storage system, as in block 908. One or more disk drive failures in one or more stripes the RAID 6 storage system may be determined/detected, as in block 910. One or more stripes having one or more disk drive failures and associated with the first parity strip, the second parity strip, or a combination thereof may be built according to a defined rebuild order, as in block 912. The functionality 900 may end, as in block 914.

In one aspect, in conjunction with and/or as part of at least one block of FIGS. 8-9, the operations of methods 800 and/or 900 may include each of the following. The operations of methods 800 and/or 900 may use/hold a first parity strip of the N three parity strips (e.g., at least 3 parity strips) in a first parity-stripe of the stripe, use/hold a second parity strip of the N three parity strips in a second parity-stripe of the stripe, and/or use/hold third parity strip of the N three parity strips at the end of the stripe. The first parity strip is a P parity strip of the first parity-stripe, the second parity strip is a P parity strip, and the third parity strip is a Q parity the entire strip.

The operations of methods 800 and/or 900 may rebuild a selected portion of the stripe having a single disk drive failure and associated with a first parity strip of the N three parity strips, and/or rebuild the stripe having one or more disk drive failures and associated with one or more of the N three parity strips according to a defined rebuild order.

The operations of methods 800 and/or 900 may rebuild a Q parity strip, a data strip or a single parity strip for a single disk failure upon occurrence of a single disk drive failure; rebuild a Q parity strip and a data strip or a single parity strip or at least two data strips or parity strips occurring in a similar p-stripe associated with one or more of the two parity strips upon occurrence of at least two disk drive failures, and/or rebuild a Q parity strip and a data strip in each section of the stripe associated with the two parity strips upon occurrence of at least three or more disk drive failures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for data recovery in a computing system, comprising:
    rebuilding a Redundant Array of Independent Disks (RAID)-6 arranged as a single array subsequent to one or more disk drive failures by holding at least three parity strips per stripe and using one or more of the least three parity strips according to a location in the single array the one or more disk drive failures occurred, wherein two of the at least three parity strips are P parity strips, and wherein a first of the two P parity strips is assigned to a first section of the stripe and a second of the two P parity strips is assigned to a second section of the stripe.

2. The method of claim 1, further including using a first parity strip of the at least three parity strips in a first parity-stripe of the stripe, wherein the first parity strip of the first parity-stripe is the first of the two P parity strips.

3. The method of claim 1, further including using a second parity strip of the at least three parity strips in a second parity-stripe of the stripe, wherein the second parity strip of the second parity-stripe is the second of the two P parity strips.

4. The method of claim 1, further including using a third parity strip of the at least three parity strips at the end of the stripe, wherein the third parity strip is a Q parity strip.

5. The method of claim 1, further including rebuilding a selected portion of the stripe having a single disk drive failure and associated with a first parity strip of the at least three parity strips.

6. The method of claim 1, further including rebuilding the stripe having one or more disk drive failures and associated with one or more of the at least three parity strips according to a defined rebuild order.

7. The method of claim 1, further including:
rebuilding a Q parity strip, a data strip or a single parity strip for a single disk failure upon occurrence of a single disk drive failure;
rebuilding the Q parity strip and the data strip or the single parity strip or at least two data strips or parity strips occurring in a similar p-stripe associated with one or more of the two parity strips upon occurrence of at least two disk drive failures; or
rebuilding the Q parity strip and the data strip in each section of the stripe associated with the two parity strips upon occurrence of at least three or more disk drive failures.

8. A system for data recovery in a computing environment, comprising:
one or more computers with executable instructions that when executed cause the system to:
rebuild a Redundant Array of Independent Disks (RAID)-6 arranged as a single array subsequent to one or more disk drive failures by holding at least three parity strips per stripe and using one or more of the least three parity strips according to a location in the single array the one or more disk drive failures occurred, wherein two of the at least three parity strips are P parity strips, and wherein a first of the two P parity strips is assigned to a first section of the stripe and a second of the two P parity strips is assigned to a second section of the stripe.

9. The system of claim 8, wherein the executable instructions use a first parity strip of the at least three parity strips in a first parity-stripe of the stripe, wherein the first parity strip of the first parity-stripe is the first of the two P parity strips.

10. The system of claim 8, wherein the executable instructions use a second parity strip of the at least three parity strips in a second parity-stripe of the stripe, wherein the second parity strip of the second parity-stripe is the second of the two P parity strips.

11. The system of claim 8, wherein the executable instructions use a third parity strip of the at least three parity strips at the end of the stripe, wherein the third parity strip is a Q parity strip.

12. The system of claim 8, wherein the executable instructions rebuild a selected portion of the stripe having a single disk drive failure and associated with a first parity strip of the at least three parity strips.

13. The system of claim 8, wherein the executable instructions rebuild the stripe having one or more disk drive failures and associated with one or more of the at least three parity strips according to a defined rebuild order.

14. The system of claim 8, wherein the executable instructions:
rebuild a Q parity strip, a data strip or a single parity strip for a single disk failure upon occurrence of a single disk drive failure;
rebuild the Q parity strip and the data strip or the single parity strip or at least two data strips or parity strips occurring in a similar p-stripe associated with one or more of the two parity strips upon occurrence of at least two disk drive failures; or
rebuild the Q parity strip and the data strip in each section of the stripe associated with the two parity strips upon occurrence of at least three or more disk drive failures.

15. A computer program product for, by a processor, data recovery in a computing system, the computer program product comprising a non-transitory computer-readable storage medium having computer-readable program code portions stored therein, the computer-readable program code portions comprising:
an executable portion that rebuilds a Redundant Array of Independent Disks (RAID)-6 arranged as a single array subsequent to one or more disk drive failures by holding at least three parity strips per stripe and using one or more of the least three parity strips according to a location in the single array the one or more disk drive failures occurred, wherein two of the at least three parity strips are P parity strips, and wherein a first of the two P parity strips is assigned to a first section of the stripe and a second of the two P parity strips is assigned to a second section of the stripe.

16. The computer program product of claim 15, further including an executable portion that:
uses a first parity strip of the at least three parity strips in a first parity-stripe of the stripe, wherein the first parity strip of the first parity-stripe is the first of the two P parity strips; or
uses a second parity strip of the at least three parity strips in a second parity-stripe of the stripe, wherein the second parity strip of the second parity-stripe is the second of the two P parity strips.

17. The computer program product of claim 15, further including an executable portion that uses a third parity strip of the at least three parity strips at the end of the stripe, wherein the third parity strip is a Q parity strip.

18. The computer program product of claim 15, further including an executable portion that rebuilds a selected portion of the stripe having a single disk drive failure and associated with a first parity strip of the at least three parity strips.

19. The computer program product of claim 15, further including an executable portion that rebuilds the stripe having one or more disk drive failures and associated with one or more of the at least three parity strips according to a defined rebuild order.

20. The computer program product of claim 15, further including an executable portion that:
rebuilds a Q parity strip, a data strip or a single parity strip for a single disk failure upon occurrence of a single disk drive failure;
rebuilds the Q parity strip and the data strip or the single parity strip or at least two data strips or parity strips occurring in a similar p-stripe associated with one or more of the two parity strips upon occurrence of at least two disk drive failures; or rebuilds the Q parity strip and the data strip in each section of the stripe associated with the two parity strips upon occurrence of at least three or more disk drive failures.

\* \* \* \* \*